United States Patent
Wong et al.

[11] Patent Number: 5,841,810
[45] Date of Patent: Nov. 24, 1998

[54] MULTIPLE STAGE ADAPTIVE EQUALIZER

[75] Inventors: Hee Wong, San Jose; Abhijit Phanse, Santa Clara, both of Calif.

[73] Assignee: National Semiconductor Corporation, Santa Clara, Calif.

[21] Appl. No.: 791,382

[22] Filed: Jan. 30, 1997

[51] Int. Cl.[6] .............................. H03H 7/30; H03K 5/159
[52] U.S. Cl. ............................ 375/232; 333/18; 330/304
[58] Field of Search .................................... 375/232, 230, 375/229, 350, 257; 333/18, 28 R; 364/724.2, 724.19; 330/304; 327/553

[56] References Cited

U.S. PATENT DOCUMENTS

| | | | |
|---|---|---|---|
| 4,459,698 | 7/1984 | Yumoto et al. | 375/230 |
| 4,745,622 | 5/1988 | Gupta | 375/232 |
| 4,862,103 | 8/1989 | Funada | 330/304 |
| 5,115,213 | 5/1992 | Eguchi | 333/18 |

*Primary Examiner*—Stephen Chin
*Assistant Examiner*—Betsy L. Deppe
*Attorney, Agent, or Firm*—Limbach & Limbach L.L.P.

[57] ABSTRACT

An adaptive equalizer for adaptively equalizing a data signal received via a communications path having a signal loss magnitude which increases with signal frequency includes multiple, serially coupled adaptive filter stages. The input data signal is successively filtered and magnitude weighted by successive adaptive filter circuits in accordance with corresponding, respective adaptation control signals. The frequency domain ratio of output signals to corresponding input signals for each adaptive filter circuit represents a corresponding, respective adaptive filter transfer function. An equalizer controller, in accordance with a single equalization control signal, generates the multiple, individual adaptation control signals. The product of all of the adaptive filter transfer functions is an approximate inverse of the transfer function of the input data signal communications path, with each individual adaptive filter transfer function being an approximate inverse of a transfer function which corresponds to a portion of the input data signal communications path. The magnitude of the equalization control signal corresponds to the transfer function of the input data signal communications path, while the magnitude of each adaptation control signal corresponds to one of the transfer function corresponding to a portion of the input data signal communications path.

16 Claims, 4 Drawing Sheets

MULTIPLE STAGE ADAPTIVE EQUALIZER

BACKGROUND OF THE INVENTION

1. Field of the Invention

The present invention relates to signal equalizers for equalizing high data rate signals received via long lengths of cable, and in particular, such signal equalizers which provide adaptive equalization for high data rate, base band, binary or MLT3 encoded data signals received via long lengths of cable.

2. Description of the Related Art

As part of the process of recovering data which has been transmitted over a long length of cable at a high data rate, equalization of the data signal is required in order to compensate for the loss and phase dispersion of the cable. For example, signal losses associated with the cable increase with frequency; therefore, higher order frequency components of the data signal become increasingly attenuated as compared to the lower order frequency components. Further, in those applications where the transmission cable lengths may vary, such equalization must be based upon a complementary transfer function which is capable of adapting to variations in the cable length due to variations in the transfer function of the cable with such cable length variations.

As part of this equalizing function, filtering of the data signal is performed using a complementary (with respect to the complex loss characteristic) filter which synthesizes the inverse of the transfer function of the cable. The extent to which this filter function is able to synthesize an accurate inverse of the complex cable loss characteristic determines the extent to which inter-symbol interference due to jitter is eliminated.

SUMMARY OF THE INVENTION

An adaptive equalizer in accordance with the present invention provides for adaptive equalization of a high data rate signal received via a long length of a cable regardless of the length of the cable. Multiple adaptive filter stages serially connected in a cascade arrangement, in accordance with appropriately generated adaptation control signals, provide successive amounts of equalization as needed for any length of cable.

In accordance with one embodiment of the present invention, an adaptive equalizer with multiple, serially coupled adaptive filter stages for use in adaptively equalizing a data signal received via a communications path having a signal loss magnitude which increases with signal frequency includes adaptive filter circuits and an equalizer controller. The first adaptive filter circuit is configured to receive a first adaptation control signal and in accordance therewith receive, filter and magnitude weight an input signal in the form of an input data signal corresponding to a plurality of data and in accordance therewith provide an output signal in the form of a first equalized data signal corresponding to such plurality of data, with a frequency domain ratio of the first equalized data signal to the input data signal representing a first adaptive filter transfer function. The second adaptive filter circuit is coupled to the first adaptive filter circuit and is configured to receive a second adaptation control signal and in accordance therewith receive, filter and magnitude weight an input signal in the form of the first equalized data signal and in accordance therewith provide an output signal in the form of a second equalized data signal corresponding to the plurality of data, with a frequency domain ratio of the second equalized data signal to the first equalized data signal representing a second adaptive filter transfer function. The equalizer controller is coupled to the first and second adaptive filter circuits and is configured to receive an equalization control signal and in accordance therewith provide the first and second adaptation control signals.

The input data signal is received via a communications path which includes a plurality of serially connected, respective communications path sections, and the communications path has associated therewith a communications path transfer function with a signal loss magnitude which increases with signal frequency. The plurality of serially connected, respective communications path sections has associated therewith a plurality of corresponding, respective communications path section transfer functions, and a product of the corresponding, respective communications path section transfer functions equals the communications path transfer function. The first adaptive filter transfer function is an approximate inverse of a first one of the plurality of corresponding, respective communications path section transfer functions, and the second adaptive filter transfer function is an approximate inverse of a second one of the plurality of corresponding, respective communications path section transfer functions. The equalization control signal has a magnitude which corresponds to the communications path transfer function, the first adaptation control signal has a magnitude which corresponds to the first one of the plurality of corresponding, respective communications path section transfer functions, and the second adaptation control signal has a magnitude which corresponds to the second one of the plurality of corresponding, respective communications path section transfer functions.

In accordance with another embodiment of the present invention, an adaptive equalizer with multiple, serially coupled adaptive filter stages for providing a signal path having a signal gain magnitude which selectively increases with signal frequency includes adaptive filter circuits and an equalizer controller. The adaptive filter circuits are serially coupled to one another and are configured to receive adaptation control signals and in accordance therewith receive, filter and magnitude weight an input signal in the form of an incoming data signal corresponding to a plurality of data and in accordance therewith provide an output signal in the form of an equalized data signal corresponding to such plurality of data, with a frequency domain ratio of the equalized data signal to the incoming data signal representing an equalization transfer function with a signal gain magnitude which selectively increases with signal frequency. Each one of the adaptive filter circuits is configured to receive a respective one of the adaptation control signals and in accordance therewith receive, filter and magnitude weight a respective one of a plurality of input data signals corresponding to the plurality of data and in accordance therewith provide a corresponding, respective one of a plurality of output data signals corresponding to the plurality of data. A frequency domain ratio of each respective one of the output data signals to the corresponding, respective one of the input data signals represents a respective one of a plurality of adaptive filter transfer functions, and a product of the adaptive filter transfer functions equals the equalization transfer function. The equalizer controller is coupled to the adaptive filter circuits and is configured to receive an equalization control signal and in accordance therewith provide the adaptation control signals. The equalization control signal has a magnitude which corresponds to the equalization transfer function, and each one of the adaptation control signals has a magnitude which corresponds to a respective one of the adaptive filter transfer functions.

These and other features and advantages of the present invention will be understood upon consideration of the following detailed description of the invention and the accompanying drawings.

DETAILED DESCRIPTION OF THE INVENTION

Figure 1:
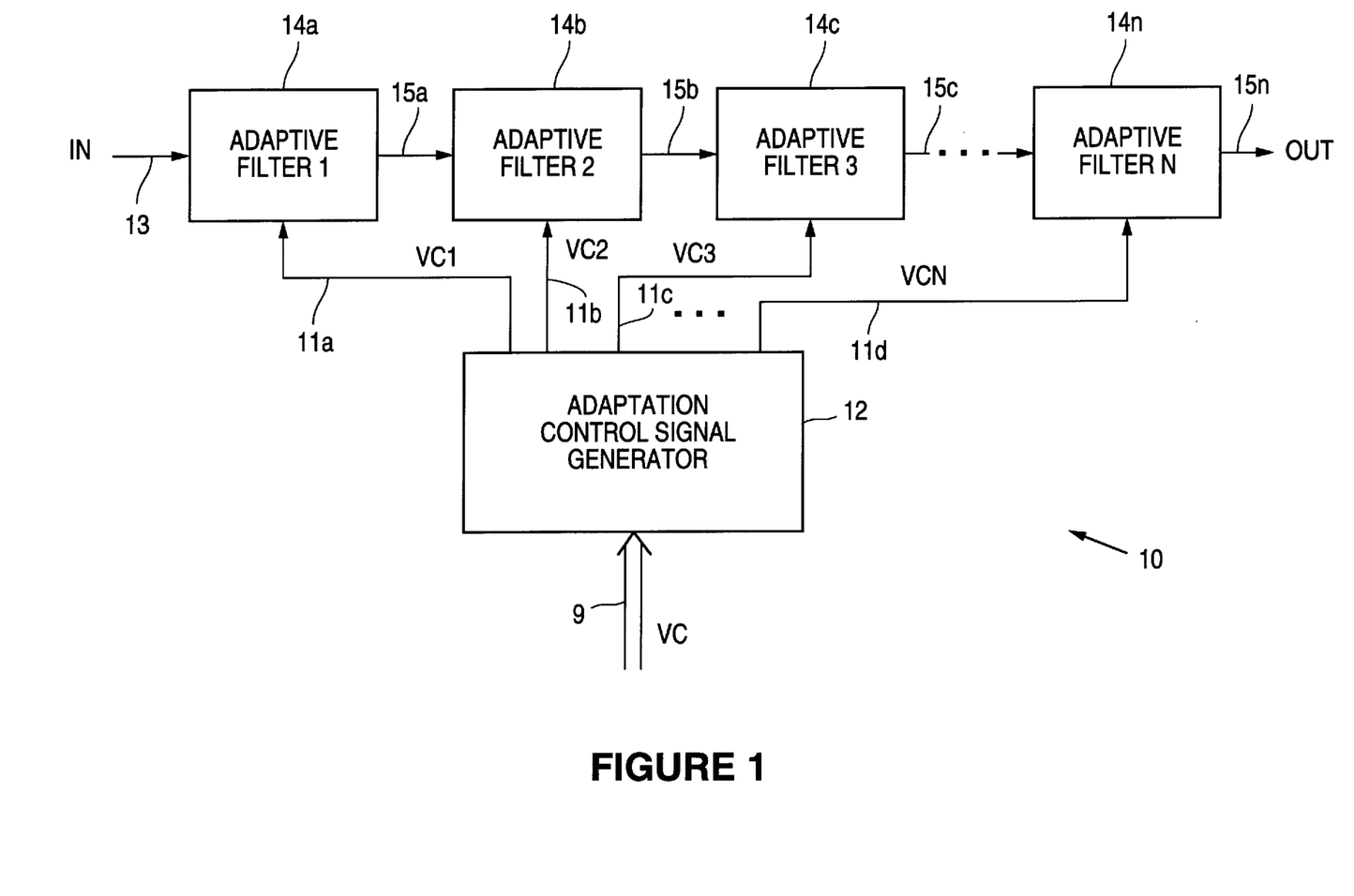
FIG. 1 is a functional block diagram of an adaptive equalizer in accordance with the present invention.

Referring to FIG. 1, an adaptive equalizer 10 in accordance with the present invention includes an adaptation control signal generator 12 and a series of adaptive filter stages 14 connected in cascade for successively filtering an input data signal 13 received via a communications path such as a long length of cable. Each adaptive filter stage 14$i$ filters and magnitude weights its respective input signal in accordance with its respective adaptation control signal 11$i$ and provides its respective output signal for further filtering and magnitude weighting by the adaptive filter stages 14 which follow. In accordance with its respective adaptation control signal 11$i$, each adaptive filter stage 14$i$ equalizes the data signal for a length of the cable (up to a predetermined maximum) via which the data signal was received.

Preferably, although not necessarily, each adaptive filter stage 14 provides similar equalization, or compensation, for an equal predetermined maximum length of cable. For example, for each cable length L, one adaptive filter stage 14 provides an appropriate amount of equalization. Accordingly, for a cable length of between 3L and 4L, the first three adaptive filter stages 14$a$, 14$b$, 14$c$ provide equal successive amounts of equalization, with the fourth adaptive filter stage 14$d$ providing that amount of equalization necessary for the remaining cable length between 3L and 4L.

The adaptation control signal generator 12 generates the individual adaptation control signals 11 based upon an input equalization control signal 9 (which can, as desired, be in the form of an analog voltage or a multiple bit digital signal).

Figure 2:
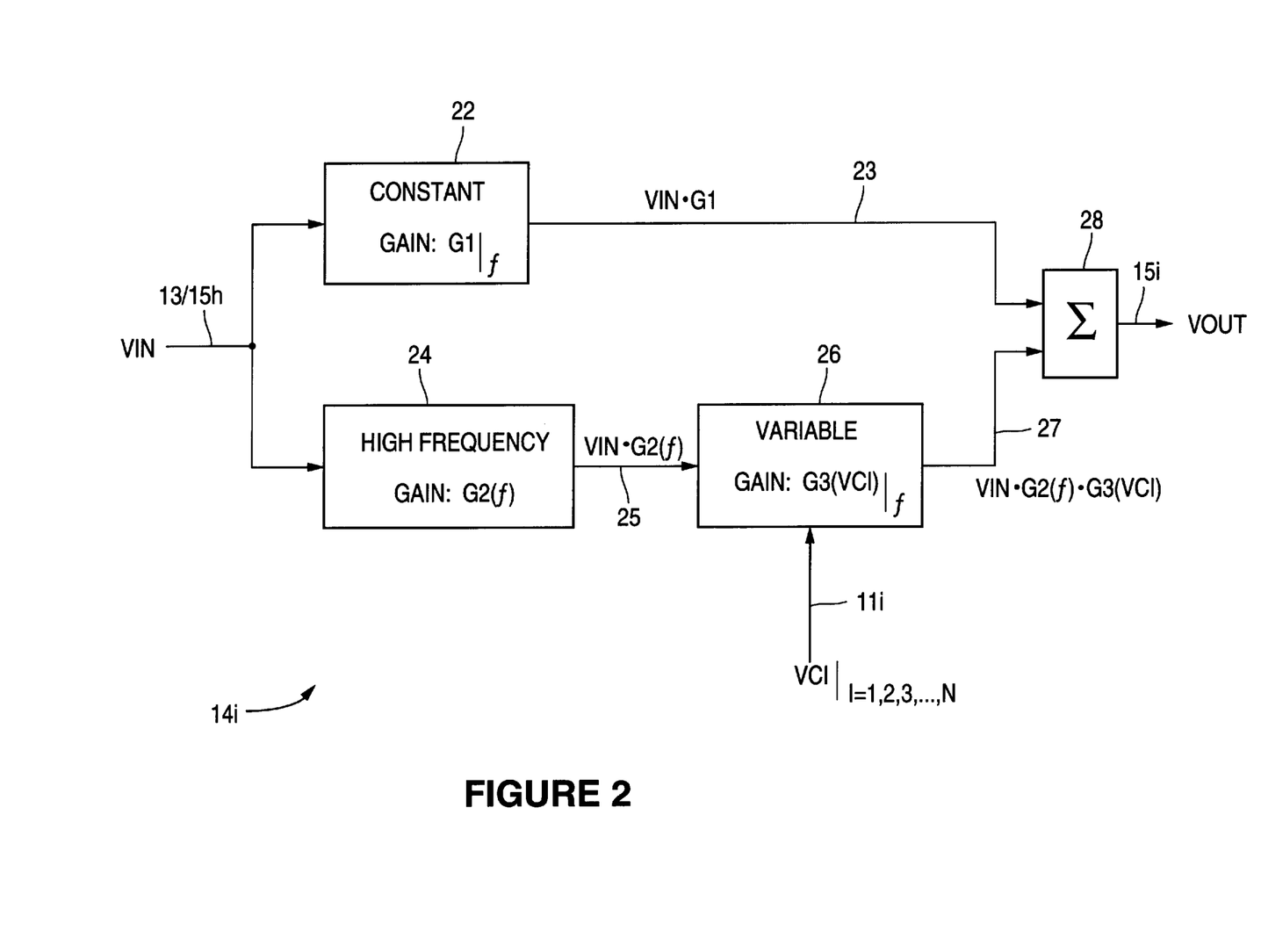
FIG. 2 is a functional block diagram of one example of the adaptive filters of FIG. 1.

Referring to FIG. 2, each of the adaptive filter stages 14 is preferably configured as shown with a constant gain signal path 22 connected in parallel with a high frequency boosted, variable gain signal path 24, 26. The input data signal 13/15h is amplified in accordance with a first signal gain G1 which is constant over frequency F to provide one of the input signals 23 to a signal summer 28. The input signal 13/15h is also amplified in accordance with a second signal gain G2 which increases with frequency in a manner which is complementary to the complex cable loss characteristic of the subject cable. The resulting high frequency boosted signal 25 is then amplified in accordance with a third signal gain G3 which, while constant over frequency F, is a function of the corresponding adaptation control signal 11$i$ (discussed in more detail below). The resulting high frequency boosted, variable gain signal 27 is then summed with the constant gain signal 23 to provide the partially equalized output signal 15$i$.

Figure 3:
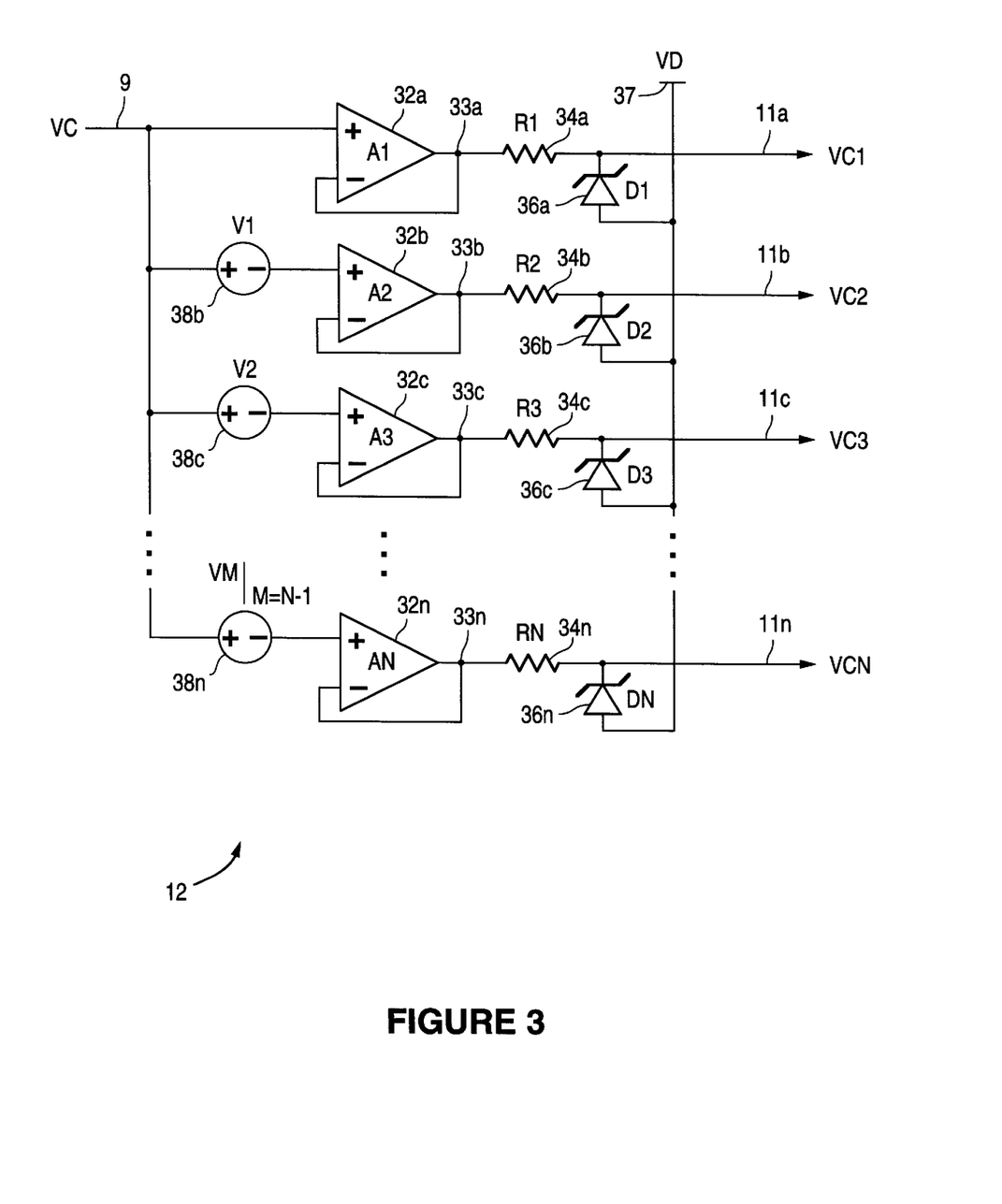
FIG. 3 is a schematic diagram of one example of the adaptation control signal generator of FIG. 1.

Referring to FIG. 3, one example of an adaptation control signal generator 12 suitable for use in the adaptive equalizer 10 of FIG. 1 receives the equalization control signal 9 in the form of an analog voltage VC and provides multiple clamped analog output voltages VC1, VC2, VC3, . . . , VCN as the adaptation control signals 11$a$, 11$b$, 11$c$, . . , 11$n$.

The equalization control signal 9 is received and buffered by multiple voltage follower circuits 32. Each of the resulting buffered voltages 33 is then DC clamped via a resistor 34 and Zener diode 36 which is biased by a bias voltage 37 having a value VD equal to the forward bias potential of the Zener diode 36. Accordingly, when the buffered voltage 33 is less than or equal to zero volts, the Zener diode 36 is turned on and the value VCI of the adaptation control voltage 11$i$ is equal to zero. When the buffered voltage 33 is between zero volts and a value equal to the Zener diode breakdown voltage minus its bias voltage VD, the corresponding adaptation control signal voltage VCI is equal to the buffered voltage 33$i$. When the buffered voltage 33 is greater than the Zener diode breakdown voltage minus its bias voltage VD, the corresponding adaptation control signal voltage VCI is equal to the Zener diode breakdown voltage minus its bias voltage VD.

Voltage sources 38 are connected in series between the incoming equalization control signal 9 and the inputs to the voltage followers 32, other than the first voltage follower circuit 32$a$ for the first adaptation control signal 11$a$, with successively higher voltage potentials V1, V2, . . . , VM (M=N−1) so as to ensure that successive ones of the adaptation control signals 11$b$, 11$c$, . . . , 11$n$ are not activated unless and until the equalization control signal 9 is high enough in amplitude. For example, for the second voltage follower circuit 32$b$ responsible for generating the second adaptation control signal 11$b$, the input voltage source 38$b$ has a voltage value of VI. Accordingly, until the equalization control signal 9 voltage VC exceeds a voltage value of V1, the second adaptation control signal 11$b$ voltage VC2 will be equal to zero (as discussed above). Similarly, for successive adaptation control signals 11$i$, until the equalization control signal 9 voltage VC exceeds a voltage value of VI, the corresponding adaptation control signal 11$i$ voltage VCI will equal zero.

It will be readily apparent to one of ordinary skill in the art that the adaptation control signal generator 12 in the adaptive equalizer 10 of FIG. 1 can also be designed to operate in a current mode rather than a voltage mode or in combinations of current and voltage modes. For example, in accordance with well known techniques, an adaptation control signal generator analogous to that depicted in FIG. 3 can be designed to receive the equalization control signal 9 in the form of an analog current IC and provide multiple clamped analog output currents IC1, IC2, IC3, . . . , ICN as the adaptation control signals 11$a$, 11$b$, 11$c$, . . . , 11$n$. Alternatively, the adaptation control signal generator 12 could be designed to receive the equalization control signal 9 in the form of an analog voltage VC and provide multiple clamped analog output currents IC1, IC2, IC3, . . . , ICN as the adaptation control signals 11$a$, 11$b$, 11$c$, . . . , 11$n$. Further alternatively, the adaptation control signal generator 12 could be designed to receive the equalization control signal 9 in the form of an analog current IC and provide multiple clamped analog output voltages VC1, VC2, VC3, . . . , VCN as the adaptation control signals 11$a$, 11$b$, 11$c$, . . . , 11$n$.

Figure 4A:
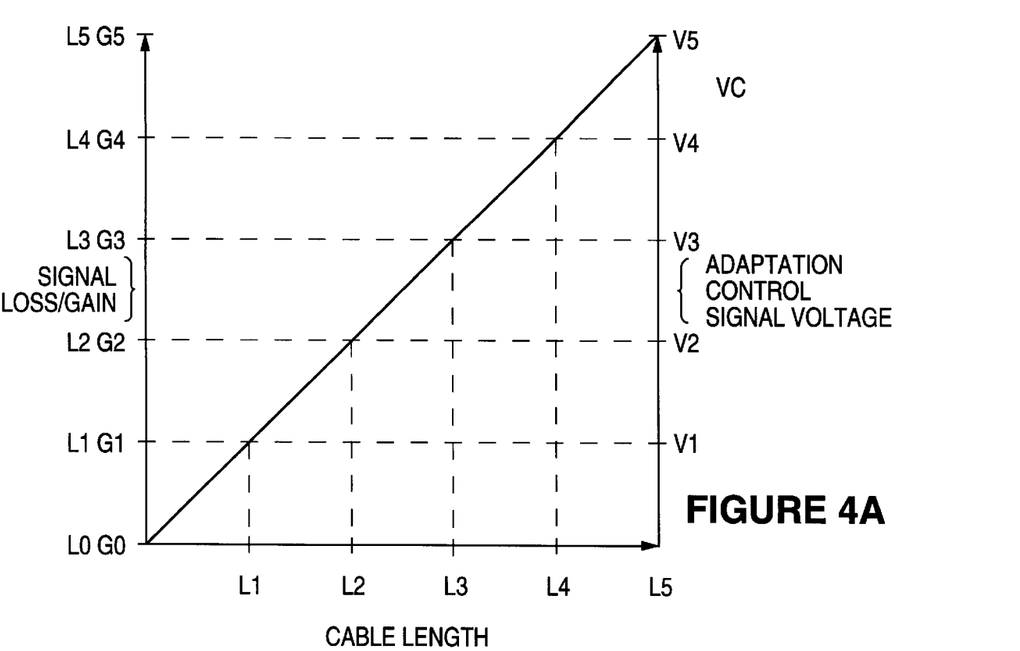
FIGS. 4A and 4B illustrate in graphical form the signal equalization performed in accordance with the adaptation control signals by an adaptive equalizer in accordance with the present invention.
Figure 4B:
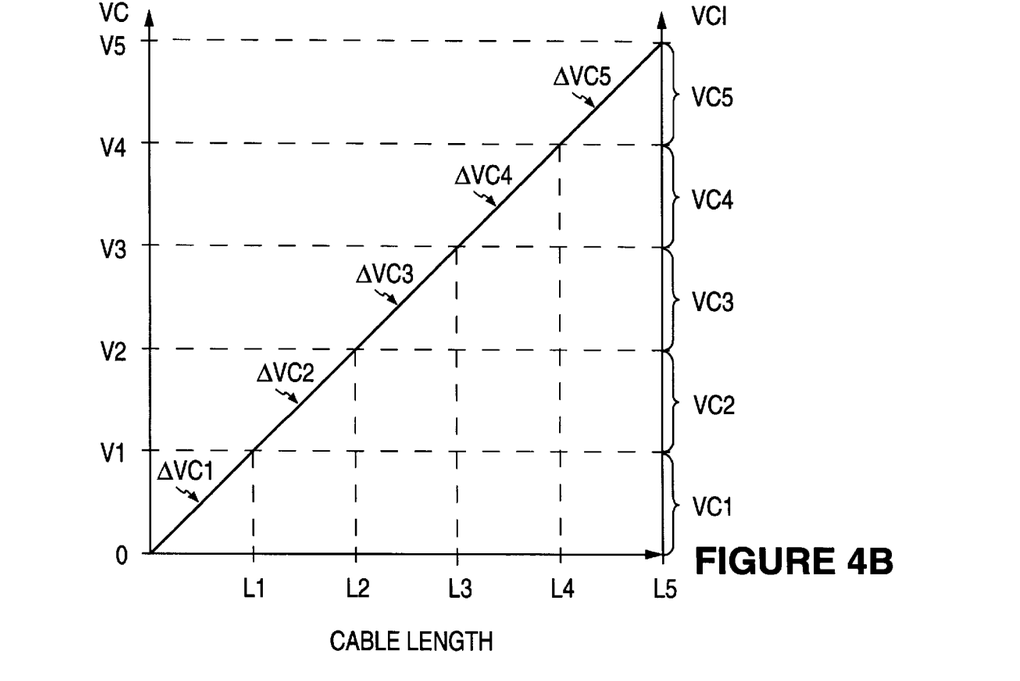

Referring to FIGS. 4A and 4B together, the equalization provided by the adaptive equalizer 10 in accordance with the present invention can be better understood. (The graphs in FIGS. 4A and 4B represent linear relationships for the sake of clarity and simplicity. It should be understood, however, that the cable loss, adaptive equalizer gain and adaptation control signal voltage characteristics can be designed in accordance with well known techniques, as desired, according to nonlinear characteristics of the subject communications path, i.e., transmission cable.) As seen in FIG. 4A, the cable loss (at a given frequency) increases with cable length. Accordingly, the adaptive equalizer gain must increase in a complementary, or inverse, manner with cable length. For example, for a cable length of L3, the cable has a cable loss of L3; therefore, the adaptive equalizer must provide a gain of G3 which equals the loss L3 of the cable. To accomplish this, the adaptive control signal must have a voltage value VC equal to V3. Referring to FIG. 4B, this means that adaptation control signals VC1, VC2 and VC3 are at their maximum values, while the remaining adaptation control signals voltages VC4 and VC5 are equal to zero.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including an adaptive equalizer with multiple, serially coupled adaptive filter stages for use in adaptively equalizing a data signal received via a communications path having a signal loss magnitude which increases with signal frequency, comprising:
   a first adaptive filter circuit configured to receive a first adaptation control signal and in accordance therewith receive, filter and magnitude weight a first input signal in a form of an input data signal corresponding to a plurality of data and in accordance therewith provide a first output signal in a form of a first equalized data signal corresponding to said plurality of data, wherein a frequency domain ratio of said first equalized data signal to said input data signal represents a first adaptive filter transfer function;
   a second adaptive filter circuit, coupled to said first adaptive filter circuit, configured to receive a second adaptation control signal and in accordance therewith receive, filter and magnitude weight a second input signal in a form of said first equalized data signal and in accordance therewith provide a second output signal in a form of a second equalized data signal corresponding to said plurality of data, wherein a frequency domain ratio of said second equalized data signal to said first equalized data signal represents a second adaptive filter transfer function; and
   an equalizer controller, coupled to said first and second adaptive filter circuits, configured to receive an equalization control signal and in accordance therewith provide said first and second adaptation control signals;
   wherein
      said input data signal is received via a communications path which includes a plurality of serially connected, respective communications path sections,
      said communications path has associated therewith a communications path transfer function with a signal loss magnitude which increases with signal frequency,
      said plurality of serially connected, respective communications path sections has associated therewith a plurality of corresponding, respective communications path section transfer functions,
      a product of said corresponding, respective communications path section transfer functions equals said communications path transfer function,
      said first adaptive filter transfer function is an approximate inverse of a first one of said plurality of corresponding, respective communications path section transfer functions,
      said second adaptive filter transfer function is an approximate inverse of a second one of said plurality of corresponding, respective communications path section transfer functions,
      said equalization control signal has a magnitude which corresponds to said communications path transfer function,
      said first adaptation control signal has a magnitude which corresponds to said first one of said plurality of corresponding, respective communications path section transfer functions, and
      said second adaptation control signal has a magnitude which corresponds to said second one of said plurality of corresponding, respective communications path section transfer functions.

2. The apparatus of claim 1, wherein each one of said first and second adaptive filter circuits comprises:
   a fixed gain signal path configured to receive said input signal and in accordance therewith provide a fixed gain signal, wherein a frequency domain ratio of said fixed gain signal to said input signal is fixed over a predetermined signal frequency range;
   a variable gain signal path configured to receive said adaptation control signal and said input signal and in accordance therewith provide a variable gain signal, wherein a frequency domain ratio of said variable gain signal to said input to signal increases with signal frequency over said predetermined signal frequency range; and
   a signal combiner, coupled to said fixed and variable gain signal paths, configured to receive and combine said fixed and variable gain signals and in accordance therewith provide said output signal.

3. The apparatus of claim 1, wherein said equalizer controller comprises:
   a first signal translator configured to receive and translate said equalization control signal and in accordance therewith provide said first adaptation control signal, wherein said first adaptation control signal magnitude
      is equal to a first minimum output magnitude when said equalization control signal magnitude is less than a first threshold magnitude,
      varies in response to said equalization control signal magnitude when said equalization control signal magnitude is greater than said first threshold magnitude and less than a first maximum input magnitude, and
      is equal to a first maximum output magnitude when said equalization control signal magnitude is greater than said first maximum input magnitude; and
   a second signal translator, coupled to said first signal translator, configured to receive and translate said equalization control signal and in accordance therewith provide said second adaptation control signal, wherein said second adaptation control signal magnitude is equal to a second minimum output magnitude when said equalization control signal magnitude is less than a second threshold magnitude, varies in response to said equalization control signal magnitude when said equalization control signal magnitude is greater than said second threshold magnitude and less than a second maximum input magnitude, and is equal to a second maximum output magnitude when said equalization control signal magnitude is greater than said second maximum input magnitude.

4. The apparatus of claim 3, wherein each one of said first and second signal translators comprises:

an input amplifier circuit configured to receive said equalization control signal and subtract therefrom a threshold signal having said threshold magnitude and in accordance therewith provide an amplified signal; and an output limiting circuit, coupled to said input amplifier circuit, configured to receive and limit said amplified signal by providing said adaptation control signal while limiting said adaptation control signal magnitude between said minimum and maximum output magnitudes.

5. An apparatus including an adaptive equalizer with multiple, serially coupled adaptive filter stages for providing a signal path having a signal gain magnitude which selectively increases with signal frequency, comprising:

a plurality of adaptive filter circuits, serially coupled to one another, configured to receive a plurality of adaptation control signals and in accordance therewith receive, filter and magnitude weight an input signal in a form of an incoming data signal corresponding to a plurality of data and in accordance therewith provide an output signal in a form of an equalized data signal corresponding to said plurality of data, wherein a frequency domain ratio of said equalized data signal to said incoming data signal represents an equalization transfer function with a signal gain magnitude which selectively increases with signal frequency, each one of said plurality of adaptive filter circuits is configured to receive a respective one of said plurality of adaptation control signals and in accordance therewith receive, filter and magnitude weight a respective one of a plurality of input data signals corresponding to said plurality of data and in accordance therewith provide a corresponding, respective one of a plurality of output data signals corresponding to said plurality of data, a frequency domain ratio of each respective one of said plurality of output data signals to said corresponding, respective one of said plurality of input data signals represents a respective one of a plurality of adaptive filter transfer functions, and a product of said adaptive filter transfer functions equals said equalization transfer function; and an equalizer controller, coupled to said plurality of adaptive filter circuits, configured to receive an equalization control signal and in accordance therewith provide said plurality of adaptation control signals, wherein said equalization control signal has a magnitude which corresponds to said equalization transfer function, and each one of said plurality of adaptation control signals has a magnitude which corresponds to a respective one of said plurality of adaptive filter transfer functions.

6. The apparatus of claim 5, wherein each one of said plurality of adaptive filter circuits comprises:

a fixed gain signal path configured to receive said input data signal and in accordance therewith provide a fixed gain signal, wherein a frequency domain ratio of said fixed gain signal to said input data signal is fixed over a predetermined signal frequency range;

a variable gain signal path configured to receive said adaptation control signal and said input data signal and in accordance therewith provide a variable gain signal, wherein a frequency domain ratio of said variable gain signal to said input data signal increases with signal frequency over said predetermined signal frequency range; and a signal combiner, coupled to said fixed and variable gain signal paths, configured to receive and combine said fixed and variable gain signals and in accordance therewith provide said output signal.

7. The apparatus of claim 5, wherein said equalizer controller comprises a plurality of signal translators configured to receive and translate said equalization control signal and in accordance therewith provide said plurality of adaptation control signals, wherein each one of said plurality of adaptation control signal magnitudes:

is equal to a respective minimum output magnitude when said equalization control signal magnitude is less than a respective threshold magnitude;

varies in response to said equalization control signal magnitude when said equalization control signal magnitude is greater than said respective threshold magnitude and less than a respective maximum input magnitude; and is equal to a respective maximum output magnitude when said equalization control signal magnitude is greater than said respective maximum input magnitude.

8. The apparatus of claim 7, wherein each one of said plurality of signal translators comprises:

an input amplifier circuit configured to receive said equalization control signal and subtract therefrom a respective threshold signal having said respective threshold magnitude and in accordance therewith provide an amplified signal; and an output limiting circuit, coupled to said input amplifier circuit, configured to receive and limit said amplified signal by providing a respective one of said plurality of adaptation control signals while limiting said respective one of said plurality of adaptation control signal magnitudes between said respective minimum and maximum output magnitudes.

9. A method of adaptively equalizing a data signal received via a communications path having a signal loss magnitude which increases with signal frequency, comprising the steps of:

receiving a first input signal in a form of an input data signal corresponding to a plurality of data via a communications path which includes a plurality of serially connected, respective communications path sections, wherein said communications path has associated therewith a communications path transfer function with a signal loss magnitude which increases with signal frequency, said plurality of serially connected, respective communications path sections has associated therewith a plurality of corresponding, respective communications path section transfer functions, and a product of said corresponding, respective communications path section transfer functions equals said communications path transfer function;

receiving a first adaptation control signal and in accordance therewith filtering and magnitude weighting said input data signal and in accordance therewith generating a first output signal in a form of a first equalized data signal corresponding to said plurality of data, wherein a frequency domain ratio of said first equalized data signal to said input data signal represents a first adaptive filter transfer function and said first adaptive filter transfer function is an approximate inverse of a first one of said plurality of corresponding, respective communications path section transfer functions;

receiving a second adaptation control signal and in accordance therewith filtering and magnitude weighting a second input signal in a form of said first equalized data signal and in accordance therewith generating a second output signal in a form of a second equalized data signal corresponding to said plurality of data, wherein a frequency domain ratio of said second equalized data signal to said first equalized data signal represents a second adaptive filter transfer function and said second adaptive filter transfer function is an approximate inverse of a second one of said plurality of corresponding, respective communications path section transfer functions; and receiving an equalization control signal and in accordance therewith generating said first and second adaptation control signals, wherein said equalization control signal has a magnitude which corresponds to said communications path transfer function, said first adaptation control signal has a magnitude which corresponds to said first one of said plurality of corresponding, respective communications path section transfer functions, and said second adaptation control signal has a magnitude which corresponds to said second one of said plurality of corresponding, respective communications path section transfer functions.

10. The method of claim 9, wherein said step of receiving a first adaptation control signal and in accordance therewith filtering and magnitude weighting said input data signal and in accordance therewith generating a first output signal in a form of a first equalized data signal corresponding to said plurality of data and said step of receiving a second adaptation control signal and in accordance therewith filtering and magnitude weighting a second input signal in a form of said first equalized data signal and in accordance therewith generating a second output signal in a form of a second equalized data signal corresponding to said plurality of data each comprises:

amplifying said input signal with a fixed signal gain and in accordance therewith generating a fixed gain signal, wherein a frequency domain ratio of said fixed gain signal to said input signal is fixed over a predetermined signal frequency range;

amplifying said input signal with a variable signal gain in accordance with said adaptation control signal and in accordance therewith generating a variable gain signal, wherein a frequency domain ratio of said variable gain signal to said input signal increases with signal frequency over said predetermined signal frequency range; and combining said fixed and variable gain signals and in accordance therewith generating said output signal.

11. The method of claim 9, wherein said step of receiving an equalization control signal and in accordance therewith generating said first and second adaptation control signals comprises:

translating said equalization control signal and in accordance therewith generating said first adaptation control signal, wherein said first adaptation control signal magnitude is equal to a first minimum output magnitude when said equalization control signal magnitude is less than a first threshold magnitude, varies in response to said equalization control signal magnitude when said equalization control signal magnitude is greater than said first threshold magnitude and less than a first maximum input magnitude, and is equal to a first maximum output magnitude when said equalization control signal magnitude is greater than said first maximum input magnitude; and translating said equalization control signal and in accordance therewith generating said second adaptation control signal, wherein said second adaptation control signal magnitude is equal to a second minimum output magnitude when said equalization control signal magnitude is less than a second threshold magnitude, varies in response to said equalization control signal magnitude when said equalization control signal magnitude is greater than said second threshold magnitude and less than a second maximum input magnitude, and is equal to a second maximum output magnitude when said equalization control signal magnitude is greater than said second maximum input magnitude.

12. The method of claim 11, wherein said steps of translating said equalization control signal and in accordance therewith generating said first and second adaptation control signal each comprises:

receiving said equalization control signal and subtracting therefrom a threshold signal having said threshold magnitude and in accordance therewith generating an amplified signal; and limiting said amplified signal by generating said adaptation control signal while limiting said adaptation control signal magnitude between said minimum and maximum output magnitudes.

13. A method of adaptively equalizing a data signal with a signal gain magnitude which selectively increases with signal frequency, comprising the steps of:

receiving a plurality of adaptation control signals and in accordance therewith receiving and successively performing filtering and magnitude weighting operations upon an input signal in a form of an incoming data signal corresponding to a plurality of data and in accordance therewith generating an output signal in a form of an equalized data signal corresponding to said plurality of data, wherein a frequency domain ratio of said equalized data signal to said incoming data signal represents an equalization transfer function with a signal gain magnitude which selectively increases with signal frequency, and wherein each one of said filtering and magnitude weighting operations includes the step of receiving a respective one of said plurality of adaptation control signals and in accordance therewith receiving, filtering and magnitude weighting a respective one of a plurality of input data signals corresponding to said plurality of data and in accordance therewith generating a corresponding, respective one of a plurality of output data signals corresponding to said plurality of data, and further wherein a frequency domain ratio of each respective one of said plurality of output signals to said corresponding, respective one of said plurality of input signals represents a respective one of a plurality of adaptive filter transfer functions, and a product of said adaptive filter transfer functions equals said equalization transfer function; and receiving an equalization control signal and in accordance therewith generating said plurality of adaptation control signals, wherein said equalization control signal has a magnitude which corresponds to said equalization transfer function, and each one of said plurality of adaptation control signals has a magnitude which corresponds to a respective one of said plurality of adaptive filter transfer functions.

14. The method of claim 13, wherein the step of receiving a respective one of said plurality of adaptation control signals and in accordance therewith receiving, filtering and magnitude weighting a respective one of a plurality of input data signals corresponding to said plurality of data and in accordance therewith generating a corresponding, respective one of a plurality of output data signals corresponding to said plurality of data comprises:

amplifying said input data signal with a fixed signal gain and in accordance therewith generating a fixed gain signal, wherein a frequency domain ratio of said fixed gain signal to said input data signal is fixed over a predetermined signal frequency range;

amplifying said input data signal with a variable signal gain in accordance with said adaptation control signal and in accordance therewith generating a variable gain signal, wherein a frequency domain ratio of said variable gain signal to said input data signal increases with signal frequency over said predetermined signal frequency range; and combining said fixed and variable gain signals and in accordance therewith generating said output signal.

15. The method of claim 13, wherein said step of receiving an equalization control signal and in accordance therewith generating said plurality of adaptation control signals comprises receiving and translating said equalization control signal and in accordance therewith generating said plurality of adaptation control signals, wherein each one of said plurality of adaptation control signal magnitudes is equal to a respective minimum output magnitude when said equalization control signal magnitude is less than a respective threshold magnitude, varies in response to said equalization control signal magnitude when said equalization control signal magnitude is greater than said respective threshold magnitude and less than a respective maximum input magnitude, and is equal to a respective maximum output magnitude when said equalization control signal magnitude is greater than said respective maximum input magnitude.

16. The method of claim 15, wherein said step of receiving and translating said equalization control signal and in accordance therewith generating said plurality of adaptation control signals comprises:

receiving said equalization control signal and subtracting therefrom a respective threshold signal having said respective threshold magnitude and in accordance therewith generating an amplified signal; and limiting said amplified signal by generating a respective one of said plurality of adaptation control signals while limiting said respective one of said plurality of adaptation control signal magnitudes between said respective minimum and maximum output magnitudes.

* * * * *

UNITED STATES PATENT AND TRADEMARK OFFICE
CERTIFICATE OF CORRECTION

PATENT NO. : 5,841,810
DATED : November 24, 1998
INVENTOR(S) : Hee Wong and Abhijit Phanse It is certified that error appears in the above-indentified patent and that said Letters Patent is hereby corrected as shown below:

In Col. 6, line 38, after "input", delete "to".

Signed and Sealed this

Seventeenth Day of April, 2001

Attest:

NICHOLAS P. GODICI

*Attesting Officer*   Acting Director of the United States Patent and Trademark Office

(12) REEXAMINATION CERTIFICATE (4566th)
United States Patent
Wong et al.

(10) Number: US 5,841,810 C1
(45) Certificate Issued: Apr. 30, 2002

(54) MULTIPLE STAGE ADAPTIVE EQUALIZER

(75) Inventors: Hee Wong, San Jose; Abhijit Phanse, Santa Clara, both of CA (US)

(73) Assignee: National Semiconductor Corporation, Santa Clara, CA (US)

Reexamination Request:
No. 90/005,847, Oct. 17, 2000

Reexamination Certificate for:
Patent No.: 5,841,810
Issued: Nov. 24, 1998
Appl. No.: 08/791,382
Filed: Jan. 30, 1997

Certificate of Correction issued Apr. 17, 2001.

(51) Int. Cl.$^7$ ............... H03K 7/30; H03K 5/159
(52) U.S. Cl. ............... 375/232; 333/18; 330/304
(58) Field of Search ............... 375/229, 230, 375/232, 257, 350; 327/553; 330/304; 333/18, 28 R; 708/322, 323

(56) References Cited

U.S. PATENT DOCUMENTS

| | | | |
|---|---|---|---|
| 4,459,698 A | 7/1984 | Yumoto et al. | 375/16 |
| 4,745,622 A | 5/1988 | Gupta | 375/14 |
| 4,862,103 A | 8/1989 | Funada | 330/304 |
| 5,115,213 A | 5/1992 | Equchi | 333/18 |
| 5,563,911 A | 10/1996 | Uesugi et al. | 375/232 |

FOREIGN PATENT DOCUMENTS

| | | | |
|---|---|---|---|
| DE | 398 660 B | 9/1992 | |
| EP | 0 656 694 A2 | 6/1995 | H04B/3/14 |

*Primary Examiner*—Young T. Tse (57) ABSTRACT

An adaptive equalizer for adaptively equalizing a data signal received via a communications path having a signal loss magnitude which increases with signal frequency includes multiple, serially coupled adaptive filter stages. The input data signal is successively filtered and magnitude weighted by successive adaptive filter circuits in acordance with corresponding, respective adaptation control signals. The frequency domain ratio of output signals to corresponding input signals for each adaptive filter circuit represents a corresponding, respective adaptive filter transfer function. An equalizer controller, in accordance with a single equalization control signal, generates the multiple, individual adaptation control signals. The product of all of the adaptive filter transfer functions is an approximate inverse of the transer function of the input data signal communications path, with each individual adaptive filter transfer function being an approximate inverse of a transfer function which corresponds to a portion of the input data signal communications path. The magnitude of the equalization control signal corresponds to the transfer function of the input data signal communications path, while the magnitude of each adaptation control signal corresponds to one of the transfer function corresponding to a portion of the input data signal communications path.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 1–15 and 16 is confirmed.

\* \* \* \* \*